United States Patent [19]

Schau, III et al.

[11] Patent Number: 4,665,645
[45] Date of Patent: May 19, 1987

[54] STRUCTURALLY DEGRADABLE ROOT DIRECTIVE TREE PLANTER BOX

[76] Inventors: Howard Schau, III, 12 Greenmeadow Ave., Thousand Oaks, Calif. 91360; Steven C. Townsend, 8841 Moorcroft Ave., Canoga Park, Calif. 91304

[21] Appl. No.: 759,451

[22] Filed: Jul. 26, 1985

[51] Int. Cl.$^4$ .............................................. A01G 17/00
[52] U.S. Cl. .......................................... 47/25; 47/33; 47/48.5
[58] Field of Search ................ 47/25, 26, 32, 33, 48.5, 47/66, 73–77, 86

[56] References Cited

U.S. PATENT DOCUMENTS

| 109,098 | 11/1870 | Adams | 47/32 |
|---|---|---|---|
| 173,446 | 2/1876 | Cottman | 47/25 |
| 1,530,109 | 3/1925 | Cummings | 47/48.5 |
| 1,534,508 | 4/1925 | Earp-Thomas | 47/66 |
| 2,017,308 | 10/1985 | Elmer | 47/77 |
| 2,436,770 | 2/1948 | Hill et al. | 47/33 |
| 2,769,277 | 11/1956 | Keelor | 47/33 |
| 2,859,558 | 11/1958 | Hallum | 47/73 |
| 3,053,010 | 9/1962 | DeShazor, Jr. | 47/66 |
| 3,302,325 | 2/1967 | Ferrand | 47/74 |
| 3,415,013 | 12/1968 | Galbraith | 47/33 |
| 3,828,473 | 8/1974 | Morey | 47/77 |
| 3,889,416 | 6/1975 | Bergeron | 47/86 |
| 3,929,937 | 12/1975 | Clendinning et al. | 47/74 |
| 3,951,294 | 4/1976 | Wilson | 47/33 |
| 3,991,516 | 11/1976 | Cicero | 47/73 |
| 4,006,558 | 2/1977 | Neddo et al. | 47/77 |
| 4,019,279 | 4/1977 | Moorman et al. | 47/66 |
| 4,192,096 | 3/1980 | Platt et al. | 47/73 |

FOREIGN PATENT DOCUMENTS 110004  6/1964  Netherlands .......................... 47/33

*Primary Examiner*—James R. Feyrer
*Attorney, Agent, or Firm*—William H. Maxwell

[57] ABSTRACT

A planter box for controlling the root growth of newly planted trees so that the roots emanate at a level spaced below grade, characterized by structurally degradable panels that yield to growth of the root system so as to separate and disintegrate in time as the tree matures and increases in caliper, and preferably made of disintegratable homoplastic material.

8 Claims, 6 Drawing Figures

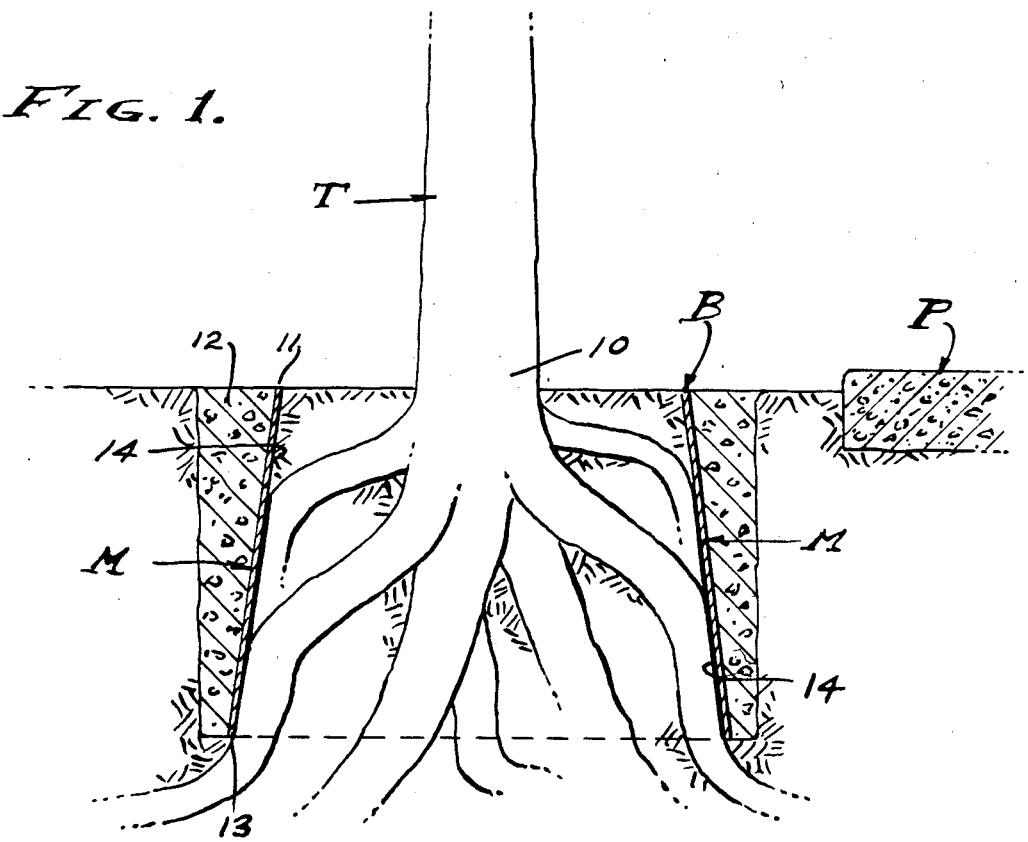
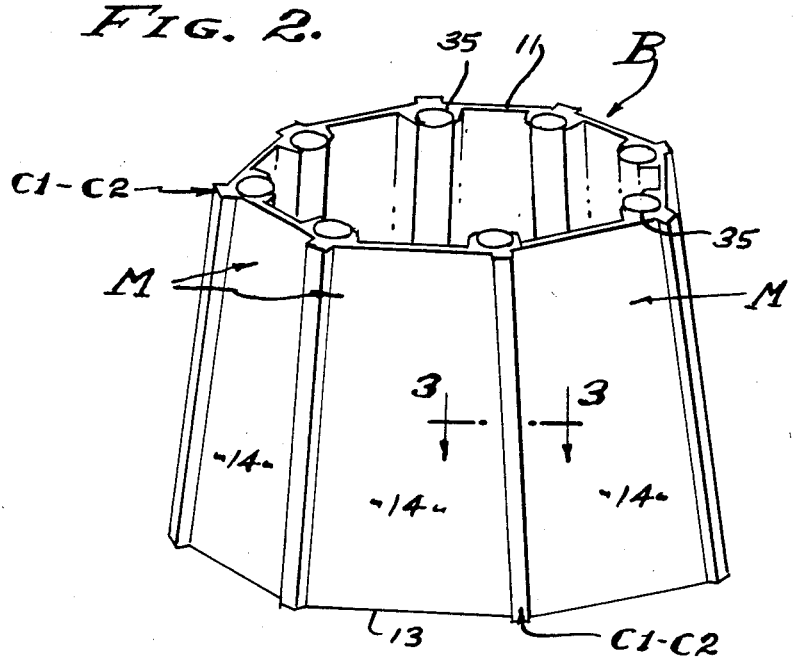

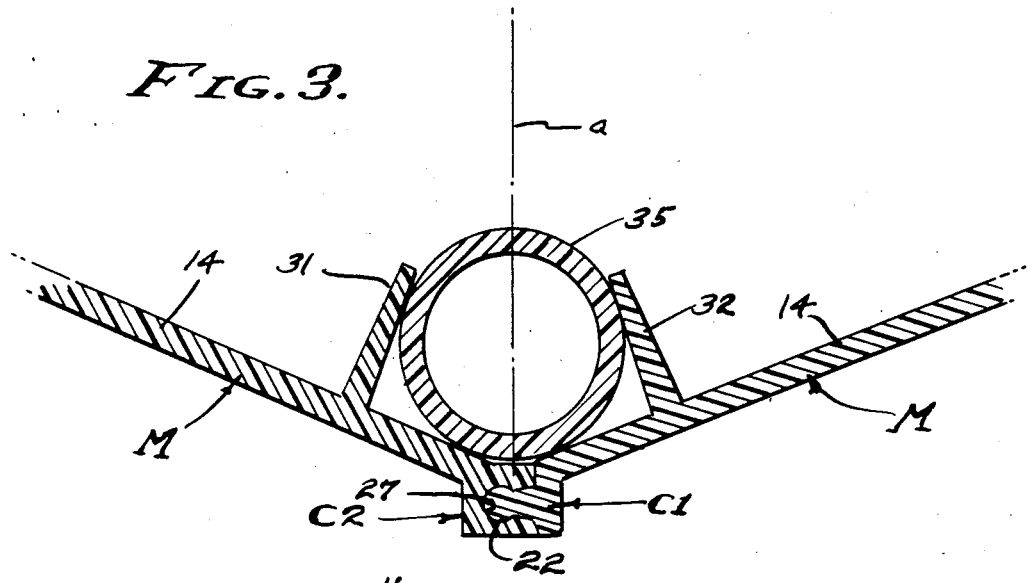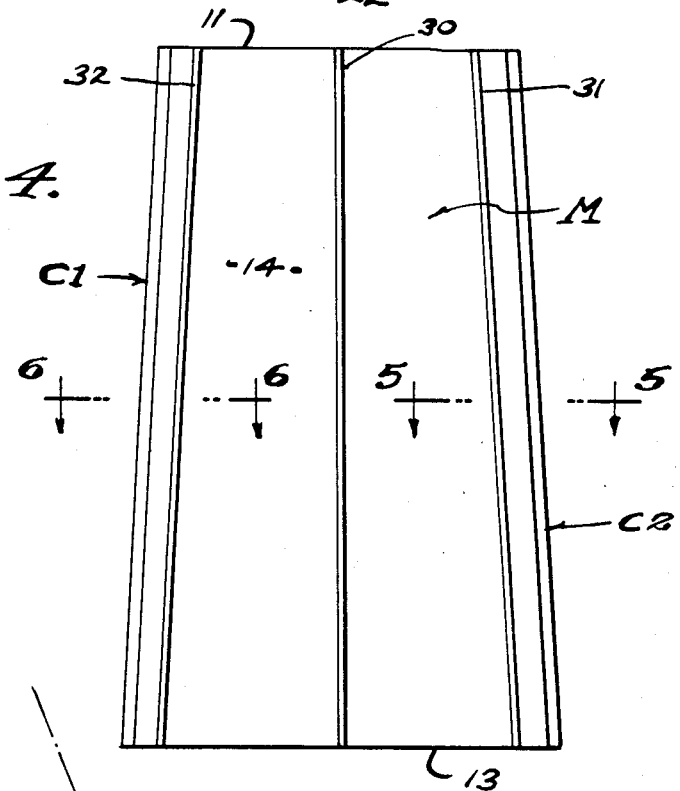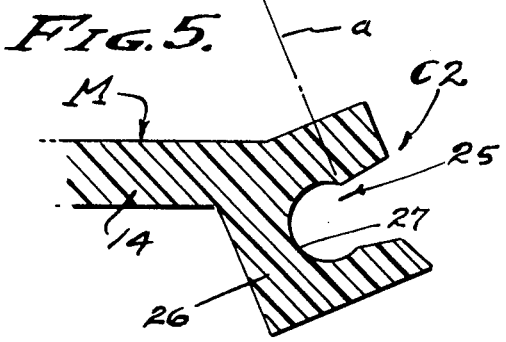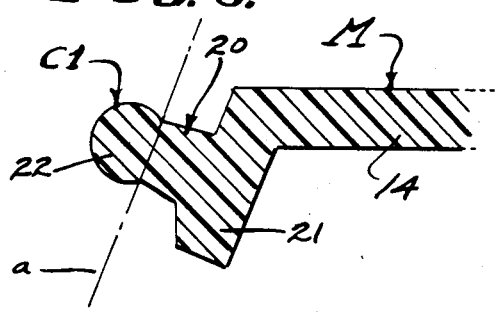

STRUCTURALLY DEGRADABLE ROOT DIRECTIVE TREE PLANTER BOX

BACKGROUND OF THE INVENTION

This invention relates to the planting of trees adjacent to pavements and structures which are subject to damage by a growing root system of the trees. It is a recognized phenomanon that the root systems of trees seek out and reach for moisture and nutrients from the surrounding soil, and that in many trees there are runner-roots that tend to follow closely beneath the grade level so as to penetrate directly under paving such as sidewalks and the like, and under foundations of building structures. Damage is likely as the runner-roots grow and volumetrically displace pavements and structures, lifting them upwardly. Therefore, it is a general object of this invention to provide a planter box that can be assembled around a tree to control the growth pattern of the root system, and/or any such growth or shrubbery planted closely adjacent to pavements and structures that require protection against displacement thereby.

It is prior art practice to grow young trees in ferrous containers several times deeper than the diameter of the container. These planters have been provided with removable bottoms, and have simply been placed in the ground with backfill therearound, whereupon the tree quickly takes root and the container soon rusts away. In practice, rusting away of the container requires two or three years, prior to which the root system has been effectively established and directed so as to emanate from beneath the open bottom of the container. It is an object of this invention to provide this root control effect in an improved planter box assembled of panels, in which the tree may be grown from seed, or alternately into which the tree may be installed or transplanted at the time of final planting. With the present invention, the planter box is of a depth that accomodates the root system of an immature tree, and extends from ground level to a substantial depth approximating the depth of state of the art nursery containers, some of which are several feet deep.

State of the art planter boxes of the type under consideration are not altogether satisfactory, it being an object of this invention to improve upon the planter boxes that have been employed for root control. With the present invention, construction of the planter box is structurally degradable, both mechanically and materially, so as to yield to growth of the tree root system and disintegrate as and when the tree matures.

Heretofore, planter boxes for this purpose have been of square plan form, with no thought applied to the natural radial growth pattern of the root systems, and with no thought applied to the state of the art digging of a hole for planting such trees. In practice, powered augers dig a round hole which is compatable with the radial growth of a root system. However, a square box does not fit a round hole, and it becomes necessary to manually dig out corners of the round hole in order to receive the square box. This extra manual labor is eliminated with the present invention which provides a planter box of polygonal plan form which is substantially round.

Heretofore, planter boxes for root control have been made of permanent form with non-degradable and permanent material which does not disintegrate with time and having smooth impervious walls, with no thought applied to its restriction of future root system growth as the tree matures. Consequently, said permanent state of the art planter boxes for root control remain integral in the ground without yielding to root growth, in order to direct the root system downwardly. However, this unyielding character of prior art planter boxes adversely restricts and chokes the root system as and when the tree matures and increases in caliper. Therefore, it is an object of the invention to provide a planter box that will burst apart and disintegrate in due time by yielding to the growth of the root system and the inevitable increased caliper of the tree. With the present invention, the planter box is fragmented and is structurally demolished as and when the root system and tree caliper exceeds the restrictive limits of the planter box, whereupon the pieces thereof remain buried or erupt as fragments and debris. With the present invention a Homo-Plastic material is used for this planter box construction, a material that is structurally degradable in a known period of time before which the tree root system has already been established at a depth which will not adversely affect adjacent paving or like structures.

A method of installation for root control planters is to pack the surrounding hole annulus with rock, whereby water percolates downwardly to the root system emanating below the planter box. The tree roots inherently seek moisture and nutrient, it being an object of this invention to provide nutrient application means in the planter structure, whereby nutrients can be directed to the roots where they emanate from below the planter box.

The square thin walled planter boxes of the prior art tend to be weak and deformable into paralleogram configuration, since the corners thereof are not reinforced. It is an object of this invention to provide a polygonal planter box form with reinforced corners, advantageously employing the aforesaid nutrient application means. It is also an object of this invention to modularize the planter box structure whereby one regular panel configuration suffices in a multiplicity thereof to produce the polygonal planter box assembly. Furthermore, the aforementioned nutrient application means is advantageously employed in combination with the multiplicity of panels to secure and reinforced the corner joinder of said panels.

SUMAMRY OF THE INVENTION

This invention resides in the structure of a root controlling planter box comprised of a multiplicity of like and identical panels, in a combination forming a polygonal but substantially round form. There is one regular panel module configuration used in a multiplicity joined edge to edge in circumferential engagement with nutrient application means captured therebetween to reinforce and to stabilize said joinder. The planer box is subject to disintegration as a result of root growth and also due to its fabrication out of a Homo-Plastic material subject to structural degradation over an expectedly approximated known period of time, said period being coincidental with the approximate period of time that occurs in establishing a root system during normal growth of a tree reaching maturity. The general purpose of such a planter box is to establish a root system at sufficient depth which will not adversely affect pavements and structures to lift them undesirably.

The foregoing and various other objects and features of this invention will be apparent and fully understood from the following detailed description of the typical preferred form and application thereof, throughout which description reference is made to the accompanying drawings.

FIG. 1 is a sectional view of a tree planting with the planter box herein disclosed.

FIG. 2 is a perspective view of the planter box.

FIG. 3 is an enlarged sectional view taken as indicated by line 3—3 on FIG. 2.

FIG. 4 is an elevational view of one of the panels of which the planter box is comprised.

And, FIGS. 5 and 6 are enlarged fragmentary views taken as indicated by line 5—5 and 6—6 on FIG. 4.

PREFERRED EMBODIMENT

Referring now to FIG. 1 of the drawings, a typical tree planting is shown wherein a tree T is contained in planter box B of the present invention, and planted at grade level closely adjacent a pavement structure P. Assuming that the tree has had some time to grow and mature, then the lateral extending runner root system has emanated from below the planter box B so as to extend well beneath the pavement P, as shown. The crown 10 of the root system is at grade level coincidental with the top edge 11 of the box, a relationship which does not change. It is presumed that a round planting hole has been dug by an auger and that the hole is filled with rock 12 in the annulus surrounding the planter box B, as may be required.

The planter box B in its assembled condition is shown in FIG. 2 of the drawings, preferably of octagonal plan form, and though it is polygonal it can be round if so desired. As shown, the polygonal planter box B is comprised of a multiplicity of like and preferably identical panel modules M, each of exactly the same one configuration and joined edge to edge in circumferential continuity so as to form an imperforate root impenatrable wall 14 extending from grade lever to a distance well below grade. The depth of the wall 14 will vary according to the size of the box that is constructed and for example a box of a nominal 24 inch diameter at the top 11 and of a nominal 29 inch diameter at the bottom 13 will be approximately 18 inches deep to the bottom edges 13. The particular planter box B illustrated herein is constructed 23 inches accross flats and 25 inches accross corners at the top edges 11; and 28 inches accross flats and 30 inches accross corners at the bottom edges 13. Accordingly, the assembled planter box B so dimensioned drops into a 30 inch augered hole for planting a tree.

In accordance with this invention the panel module M is injection molded of a Homo Plastic material that is structurally degradable within a predetermined time period. A homoplastic material is one relating to or derived from another species, where there is a similarity of form with a different fundamental structure, and wherein there is a superficial resemblance. The plastic material used herein is Homo Polypropylene that will structurally degrade in the approximate time that a tree root system matures and reaches a stable condition. Accordingly, the assembled planter box B is an integral unit when installed and eventually degrades and disintegrates at about the time the tree root system matures and reaches an acceptably stable condition. It is to be understood that the time period factor can vary as required by changing the homoplastic character of the material from which the panel modules M are made.

The panel module M is a sectional part of the box assembly shown in FIGS. 1 and 2, and in the preferred form shown herein the panel module is a flat reinforced part of trapazoid configuration having parallel top and bottom edges 11, and 13, and downwardly divergent side edges comprised of male and female coupling means C1 and C2. The panel module M presents a bilaterally symetrical wall 14 with the means C1 and C2 angularly divergent commensurate with the increase in cross section from top to bottom of the assembly thereof. As shown herein the plan form is octagonal, in which case each panel module comprises a 45° segment of the box perimeter, and in which case the radial bisection plane of joinder between adjacent panel modules M is 22.5° from the center of the wall 14. Accordingly, the male and female coupling means C1 and C2 are angularly divergent 112.5° from the plane of wall 14 at the opposite upstanding side edges of the panel module (see FIGS. 3, 5 and 6).

The male coupling means C1 is comprised of a tongue 20 engaged in the channel of the female coupling means C2 next described. The tongue 20 is continuously coextensive with the height of the wall 14 and is turned inwardly with respect to the wall 14 to be normal to the bisection plane a of joinder between panel modules M. In practice, the continuous tongue 20 is carried by a flange 21 disposed parallel with said bisection plane and projecting from the outside of wall 14, whereby the tongue is exposed for connection to the female coupling means. A feature of this invention is the snap-together coupling action, the exposed continuous edge of the tongue 20 being enlarged in the form of a bulb 22 for this function.

The female coupling means C2 is comprised of a channel 25 engaged over the tongue of the male coupling means C1 above described. The channel 25 is continuously coextensive with the height of the wall 14 and is turned inwardly with respect to the wall 14 to be normal to the bisection plane of joinder between panel modules M. In practice, the continuous channel 25 is carried by a flange 26 disposed parallel with said bisection plane at the outside of wall 14, whereby the channel is exposed for connection to the male coupling means. Basically, the tongue 20 is coextensively engageable in the channel 25. However, a feature of this invention is the snap-together coupling action, the open continuous channel 25 having an enlarged bottom 27 for forced reception and retainment of the continuous bulb 22 of the male coupling means.

The opposite side coupling means C1 and C2 of adjacent panel modules M are snapped together as shown in FIG. 3, whereby a multiplicity of panel modules establishes a continuous imperforate perimeter wall divergent from top to bottom of the assembled planter box B. As shown there are eight such identical panel modules M to establish an octagonal assembly, which is essenially or nearly round for all practical purposes.

Each panel module wall 14 is reinforced by the coupling flanges 21 and 26, and additionally by a center rib 30 and by opposite side ribs 31 and 32. The ribs 30, 31 and 32 project inwardly from wall 14, the side ribs 31 and 32 being spaced from and parallel to the bisection plane of joinder a distance to embrace a nutrient application means N in the form of a tube 35 extending coextensively from top 12 to bottom edge 13 of the wall 14. As shown, there is a multiplicity of nutrient application tubes 35, one at each plane of joinder between panel modules M. The ribs 31 and 32 are positioned to tangentially engage the outside diameter of tube 35, the point of tangency being at an obtuse angle, shown as 225°, for embracement of tube 35. After assembly of the panel modules M, the tubes 35 are snapped into placement and held secure by the ribs 31 and 32, whereupon the polygonal configuration of the assembly is also reinforced.

The angles above specified herein are related to the basic horizontal plan form, it being understood that these angles with respect to the plane of wall 14 as related to the bisectional plane of joinder will vary with the top to bottom divergency and trapazoidal shape of the panel modules M.

From the foregoing is will be apparent that we have provided an extremely practical planter box of the type under consideration, a box unit that is of knock-cown construction made up of a multiplicity of identical panel modules that are easily assembled by snapping them together, after which the coupling means connecting them can be made tight and secure by applying a solvent or adhesive. The nutrient application tubes 35 serve to brace each corner coupling of circumferentially adjacent panel modules, and they too can be fused into place with solvent or adhesive. The planter boxes B can be assembled and stacked for compact telescopic shipment, or they can be assembled from the panel modules M and tubes 35 on the use site. Installation is as shown in FIG. 1 with the top edge 11 at grade level, with or without the surrounding rock pack. The construction material is a structurally degradable homoplastic that is destroyed with the passage of time coordinated with that time period which is required to establish tree root systems well below a pavement or structure level.

In accordance with this invention, the assembled planter box B is subject to structural disintegration as and when the root system of the tree matures sufficiently to exceed its confinement in said planter box. Initial integrity of the planter box assembly is such as to confine root growth, so that it initially emanates from below the open bottom thereof. However, root growth inherently results in expansion of the root system comensurate with increased caliper of the tree as growth occurs, and this increase in size eventually snaps the panel modules M apart and also fractures them when bending forces exceed their durability. Accordingly, the planter box configuration is destroyed in due time and the module walls are separated and actually disintegrate so as to be unidentifiable and only recognizable as fragments or pieces of plastic, and preferably a homoplastic which itself degrads and structurally disintegrates.

Having described only the typical preferred form and application of our invention, we do not wish to be limited or restricted to the specific details herein set forth, but wish to reserve to ourselves any modifications or variations that may appear to those skilled in the art as set forth within the limits of the following claims.

We claim:

1. A planter box for directing the root system growth of a newly planted tree to emanate at a level spaced beneath the ground level and to disintegrate as and when the tree matures, and including;
    a multiplicity of like mechanically separable panels of degradable material assembled around the newly planted tree, each panel being comprised of root impenatrable walls rigidly joined adjacently edge to edge in circumferential continuity by mechanically separable coupling means comprised of snap together and apart tongue and channel engagement normal to a bisection plane between adjacent panel walls engaged edge to edge, there being an inside rib on each adjacent panel and parallel with said bisection plane and convergent therewith and including a reinforcement member engaged therebetween,
    the top of the planter box being open at top edges of the panels at ground level, and the bottom of the planter box being open at the bottom edges of the panels beneath the ground level,
    whereby the mechanically separable panels of degradable material yield to the growth of the tree and mechanically separate and materially disintegrate without restricting root system growth comensurate with the increasing caliper of the maturing tree.

2. The planter box as set forth in claim 1, wherein the rigidly joined and mechanically separable coupling means is comprised of a snap together and apart male and female tongue and channel means releasably joining adjacent panels edge to edge.

3. The planter box as set forth in claim 1, wherein the panels are made of materially degradable homoplastic material for disintegration as the tree matures.

4. A polygonal planter box directing the root system growth of a newly planted tree to emanate at a level spaced beneath the ground level and to disintegrate as and when the tree matures, and including;
    a multiplicity of like mechanically separable flat panels of degradable material assembled around the newly planted tree, each panel being comprised of root impenatrable walls rigidly joined adjacently edge to edge in circumferential continuity by mechanically separable coupling means comprised of snap together and apart tongue and channel engagement normal to a bisection plane between adjacent panel walls engaged edge to edge, there being an inside rib on each adjacent panel and parallel with said bisection plane and convergent therewith and including a reinforcement member engaged therebetween,
    the top of the planter box being open at top edges of the panels at ground level, and the bottom of the planter box being open at bottom edges of the panels spaced beneath the ground level,
    whereby the mechanically separable panels of degradable material yield to the growth of the tree and mechanically separate any materially disintegrate without restricting root system growth comensurate with the increasing caliper of the maturing tree.

5. The planter box as set forth in claim 4, wherein ribs project normal to and inwardly from the adjacent panel walls and spaced from and parallel to the opposite edges thereof, the reinforcement member being a nutrient application tube extending between the top and bottom of the planter box and tangentially embraced by said convergent ribs.

6. The planter box as set forth in claim 4, wherein the panels are made of a materially degradable homoplastic material for disintegration as the tree matures.

7. A polygonal planter box for directing the root system growth of a newly planted tree to emanate divergently at a level spaced beneath the ground level and to disintegrate as and when the tree matures, and including;

a multiplicity of like mechanically separable flat panels of degradable material and of trapazoid configuration having downwardly divergent opposite side edges and assembled around the newly planted tree, each panel being comprised of root impenatrable walls rigidly joined adjacently edge to edge in circumferential continuity by mechanically separable coupling means comprised of snap together and apart tongue and channel engagement normal to a bisection plane between adjacent panel walls engaged edge to edge, there being an inside rib on each adjacent panel and parallel with said bisection plane and convergent therewith and including a reinforcement member engaged therebetween, the top of the planter box being smaller and open at the top edges of the panels at ground level, that the bottom of the planter box being larger and open at bottom edges of the panels spaced beneath the ground level, whereby the mechanically separable panels of degradable material yield to the growth of the tree and mechanically separate and materially disintegrate without restricting root system growth comensurate with the increasing caliper of the maturing tree.

8. The planter box as set forth in claim 7, wherein ribs project normal to an inwardly from the adjacent panel walls and spaced from and parallel to the opposite edges thereof, the reinforcement member being a nutrient application tube extending between the top and bottom of the planter box and tangentially embraced by said convergent ribs.

* * * * *